(12) United States Patent
Li

(10) Patent No.: US 11,433,936 B2
(45) Date of Patent: Sep. 6, 2022

(54) FOLDABLE BABY CARRIAGE FRAME

(71) Applicant: New Century Products Co., Ltd., Taipei (TW)

(72) Inventor: Jianshe Li, Kunshan (CN)

(73) Assignee: NEW CENTURY PRODUCTS CO., LTD., Taipei (TW)

( * ) Notice: Subject to any disclaimer, the term of this patent is extended or adjusted under 35 U.S.C. 154(b) by 0 days.

(21) Appl. No.: 17/138,749

(22) Filed: Dec. 30, 2020

(65) Prior Publication Data
US 2021/0213995 A1    Jul. 15, 2021

(30) Foreign Application Priority Data

Jan. 14, 2020    (CN) .......................... 202020076379.5

(51) Int. Cl.
*B62B 7/08*    (2006.01)
*B62B 9/20*    (2006.01)

(52) U.S. Cl.
CPC .................. *B62B 7/08* (2013.01); *B62B 9/20* (2013.01); *B62B 2205/003* (2013.01); *B62B 2205/04* (2013.01); *B62B 2205/20* (2013.01)

(58) Field of Classification Search
CPC .... B62B 7/08; B62B 7/06; B62B 9/20; B62B 2205/003; B62B 2205/04; B62B 2205/20
See application file for complete search history.

(56) References Cited

U.S. PATENT DOCUMENTS 8,919,806 B2 * 12/2014 Pollack ..................... B62B 7/08
280/647
9,216,755 B2 * 12/2015 Eisinger .................. B62B 5/065

FOREIGN PATENT DOCUMENTS

WO    WO-2019041495 A1 *    3/2019    ............. B62B 7/086

* cited by examiner

*Primary Examiner* — John D Walters
(74) *Attorney, Agent, or Firm* — Leong C. Lei

(57) ABSTRACT

A foldable baby carriage frame which includes a handle assembly, a front leg assembly, a front leg support assembly, a rear leg assembly, a rear leg connecting assembly, a horizontal support rod and a torsion spring. The torsion spring is provided at the connection between the front leg support assembly and the rear leg connecting assembly, and the torsion spring controls the opening and closing of the front leg support assembly and the rear leg connecting assembly by the rotation. When downward force is applied to the rear leg assembly, the rear leg assembly pivots downward with the torsion spring as the pivot point, so that the front leg support assembly and the rear leg connecting assembly realizes the effect of automatic folding. After the downward force is released, the front leg support assembly and the rear leg connecting assembly return to the state when the baby carriage is in use.

4 Claims, 2 Drawing Sheets

FOLDABLE BABY CARRIAGE FRAME

TECHNICAL FIELD OF THE INVENTION

The present invention relates to the technical field of living appliances, and more particularly to a foldable baby carriage frame.

DESCRIPTION OF THE PRIOR ART

The baby carriages originated in Europe and have a history of more than three hundred years; however, the baby carriages have only used in China for more than ten years, and China has now become the largest manufacturer of baby carriages in the world.

Nowadays, most of the baby carriages sold on the market are foldable structures, but most of them have a problem of not being able to fold completely, which results in occupying a large area and cannot be stored well in the room or the trunk of the car. Therefore, there is an urgent need to improve the structure of the baby carriages, so as to achieve the baby carriages to be completely folded.

SUMMARY OF THE INVENTION

In view of the above needs, the main purpose of the present invention is to provide a baby carriage frame that is quick to retract, easy to carry, and can be completely folded.

To achieve the above object, the present invention provides a complete foldable baby carriage frame comprising a handle assembly, a front leg assembly, a front leg support assembly, a rear leg assembly, a rear leg connecting assembly, a horizontal support rod and a torsion spring; wherein the handle assembly is rotatably connected with the upper end of the rear leg connecting assembly. Further, the front leg assembly is in a U shape, and the bottom cross rod is parallel to the level support rod. The bottom cross rod and the horizontal support rod are connected by a connecting rod, and the front leg assembly and the horizontal support rod can rotate relatively. Moreover, one end of the front leg support assembly is rotatably connected with the lower end of the rear leg connecting assembly, and the other end is rotatably connected with the front leg assembly. Furthermore, the upper end of the rear leg assembly is connected to the bottom of the handle assembly, and relatively rotates with the horizontal support rod as an axis. In addition, the torsion spring is provided at the connection between the front leg support assembly and the rear leg connecting assembly, and the torsion spring controls the opening and closing of the front leg support assembly and the rear leg connecting assembly by the rotation.

In some embodiments, the handle assembly includes an upper handle, a lower handle, a spring button and a pull wire. The upper handle is assembled by multiple independent rods and has a U-shaped structure, and the two ends of the opening are respectively connected to the upper end of the lower handle. The spring button is installed on the upper handle; the upper handle and the lower handle are hollow tubulars; and the pull wire passes through the upper handle and lower handle.

In some embodiments, the rear leg assembly is two parallel rod-shaped structures, the upper ends of which are respectively hinged with the lower handle.

In some embodiments, the two ends of the horizontal support rod are respectively connected with the lower end of the lower handle.

Beneficial Effect:

The baby carriage frame of the present invention is provided with the torsion spring on the connection between the front leg support assembly and the rear leg connecting assembly. When a downward force is applied to the rear leg assembly, the rear leg assembly pivots downward with the torsion spring as a pivot point; therefore, the front leg support assembly and the rear leg connecting assembly realize the effect of automatic folding. After the downward force is released, due to the return of the torsion spring, the front leg support assembly and the rear leg connecting assembly return to the state when the baby carriage is in use. Therefore, the structure can realize that the baby carriage frame is completely folded, and is quick to retract and easy to carry.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
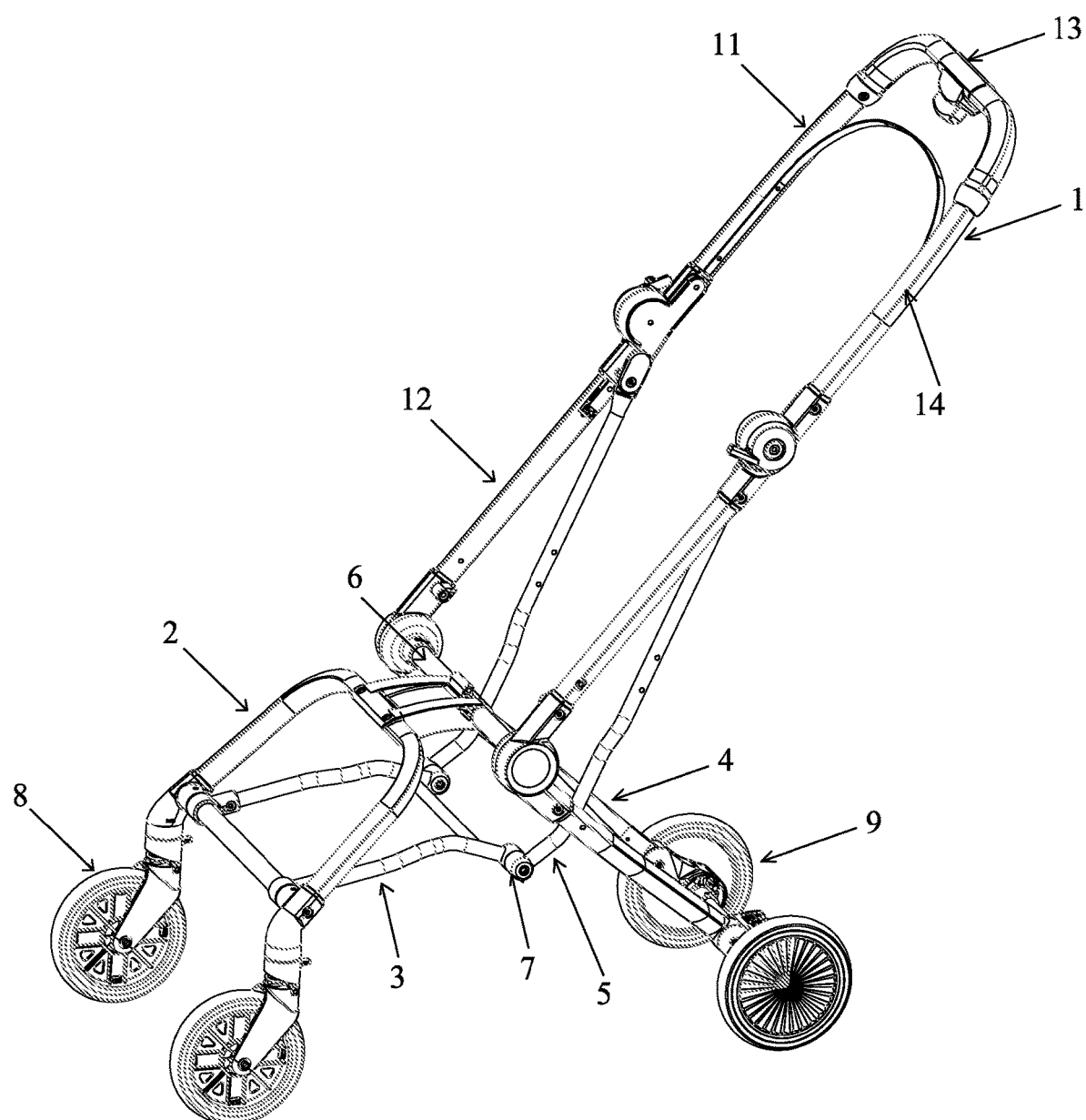
FIG. 1 is a schematic view of a structure of the baby carriage frame in the unfolding state according to Embodiment of the present invention.
Figure 2:
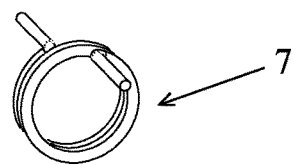
FIG. 2 is and a schematic view of a structure of the torsion spring provided in the baby carriage frame of the present invention.
Figure 3:
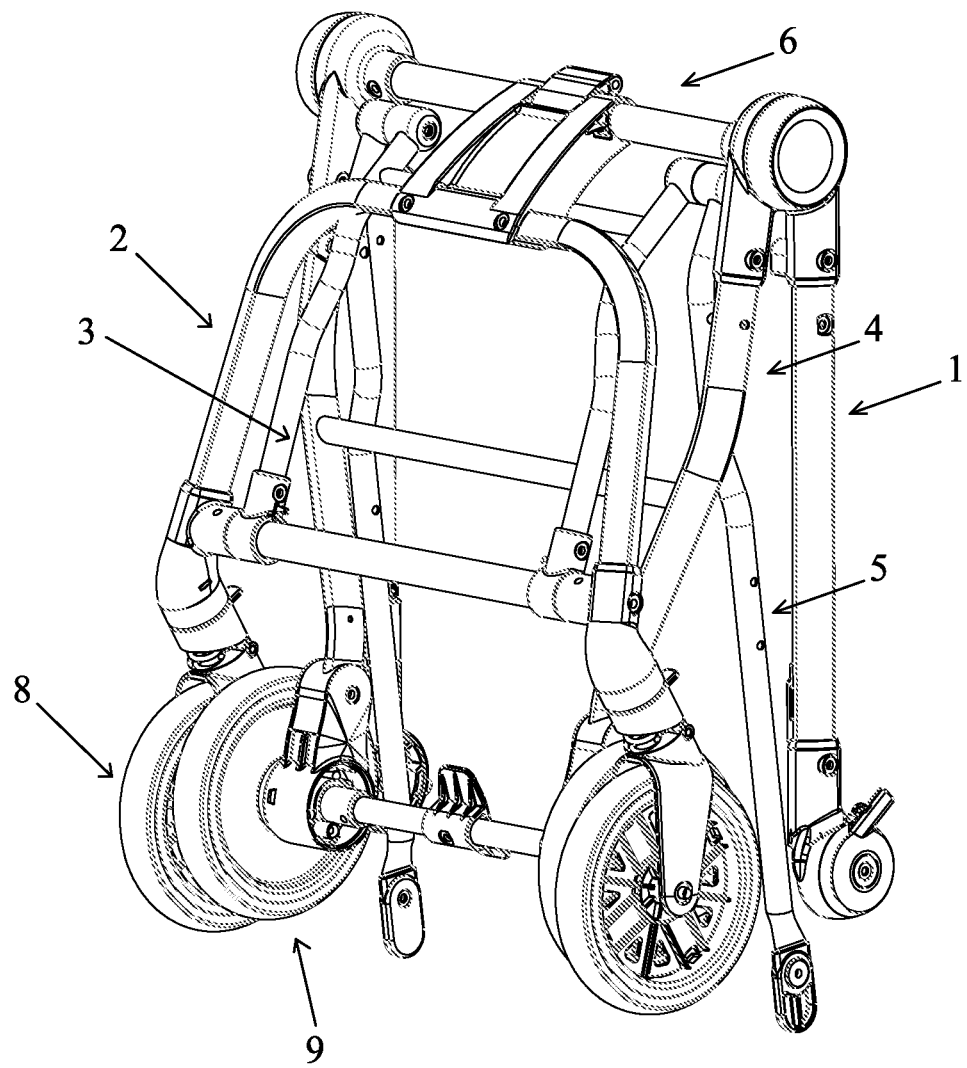
FIG. 3 is a schematic view of a structure of the baby carriage frame in the complete folding state according to Embodiment of the present invention.

The following detailed description of the present application is taken in conjunction with the accompanying drawings, in which:

As shown in FIG. 1 and FIG. 3, FIG. 1 is a schematic view of a structure of the baby carriage frame in the unfolding state according to Embodiment of the present invention; and FIG. 3 is a schematic view of a structure of the baby carriage frame in the complete folding state according to Embodiment of the present invention; wherein an upper handle 11 of a handle assembly 1 is not shown in FIG. 1 and FIG. 3.

The present invention provides a complete foldable baby carriage frame comprising a handle assembly 1, a front leg assembly 2, a front leg support assembly 3, a rear leg assembly 4, a rear leg connecting assembly 5, a horizontal support rod 6 and a torsion spring 7; wherein the handle assembly 1 is rotatably connected with the upper end of the rear leg connecting assembly 5.

Further, the front leg assembly 2 is in a U shape, and the bottom cross rod is parallel to the horizontal support rod 6. The bottom cross rod and the horizontal support rod 6 are connected by a connecting rod, and the front leg assembly 2 and the horizontal support rod 6 can rotate relatively.

Moreover, one end of the front leg support assembly 3 is rotatably connected with the lower end of the rear leg connecting assembly 5, and the other end is rotatably connected with the front leg assembly 2.

Furthermore, the upper end of the rear leg assembly 4 is connected to the bottom of the handle assembly 1, and relatively rotates with the horizontal support rod 6 as an axis.

In addition, the torsion spring 7 is provided at the connection between the front leg support assembly 3 and the rear leg connecting assembly 5, and the torsion spring 7 controls the rotation opening and closing of the front leg support assembly 2 and the rear leg assembly 4.

Further, the handle assembly 1 includes an upper handle 11, a lower handle 12, a spring button 13 and a pull wire 14. The upper handle 11 is assembled by multiple independent rods, and has a U-shaped structure. The two ends of the opening of the upper handle 11 are respectively connected to the upper end of the lower handle 12. The spring button 13 is installed on the upper handle 11; the upper handle 11 and the lower handle 12 are hollow tubulars; and the pull wire 14 passes through the upper handle 11 and lower handle 12.

Further, the rear leg assembly 4 has two parallel rod-like structures, and the upper ends of the rear leg assembly 4 are respectively hinged to the lower handle 12.

Furthermore, two ends of the horizontal support rod 6 are respectively connected to the lower end of the lower handle 12.

Moreover, as shown in FIG. 1, the foldable baby carriage frame of the present application further comprises front wheels 8 and rear wheels 9. The front wheels 8 are Mecanum-wheels, which are installed at the lower end of the front leg assembly 2; and the rear wheels 9 are axle structures. Furthermore, a rear wheel locking mechanism is provided on a rear wheel shaft; and the rear wheel locking mechanism is a conventional technology in the field.

The following detailed description of the foldable baby carriage frame of the present application is taken in conjunction with the accompanying drawings, in which:

As shown in FIG. 1, the baby carriage frame of the present invention is completely unfolded, and the pull wire 14 is pulled by a button of the spring button 13 when the spring button 13 is pressed. At this time the locking state between the upper handle 11 and the lower handle 12, and the locking state between the lower handle 12 and the rear leg assembly 4 are simultaneously released. The hinged connection between the upper handle 11 and the lower handle 12 can be freely rotated, and the hinged connection between the lower handle 12 and the rear leg assembly 4 can be freely rotated to realize the folding between the upper handle 11 and the lower handle 12, as well as the lower handle 12 and the rear leg assembly 4. At the same time, downward force is applied to the rear leg assembly 4 during the folding process, and the rear leg assembly 4 pivots downward with the torsion spring 7 as the pivot point, so that the front leg support assembly 3 and the rear leg connecting assembly 5, as well as the front leg assembly 2 and the rear leg assembly 4 realizes the effect of automatic folding.

When the baby carriage frame of the present invention is completely folded, it is only necessary to hold the upper handle 11 to lift the baby carriage frame of the present invention. At this time the force applied to the rear leg assembly 4 is released, and the torsion spring 7 returns, the front leg assembly 2, the front foot support assembly 3, the rear foot assembly 4 and the rear leg connecting assembly 5 return to the state when the carriage is in use, that is, the baby carriage frame of the present invention is complete unfolded.

The structure of a complete foldable baby carriage frame provided by the present invention can realize the complete folding of the baby carriage frame, and is quick to retract and easy to carry.

For those skilled in the art, it is obvious that the present invention is not limited to the details of the above exemplary embodiments, and the present invention can be implemented in other specific forms without departing from the spirit or basic characteristics of the present invention. Therefore, the embodiments should be regarded as exemplary and non-restrictive. The scope of the present invention is defined by the scope of the attached patent application rather than the above description. Therefore, it is intended to include all modifications within the meaning and scope of equivalent elements falling within the scope of claims of the present invention. Any reference signs in the scope of claim should not be regarded as limiting the scope of claims involved.

In addition, it should be understood that although the specification is described in accordance with the embodiments, each embodiments not only contains an independent technical solution. This narration in the specification is only for clarity, and those skilled in the art should regard the specification as an overall, the technical solutions in each embodiment can also be appropriately combined to form other embodiments that can be understood by those skilled in the art.

The foregoing description, for the purpose of explanation, has been described with reference to specific embodiments; however. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

I claim:

1. A foldable baby carriage frame, comprising:
    a handle assembly, a front leg assembly, a front leg support assembly, a rear leg assembly, a rear leg connecting assembly, a horizontal support rod and a torsion spring;
    wherein the handle assembly is rotatably connected with the upper end of the rear leg connecting assembly;
    wherein the front leg assembly is in a U shape, and the bottom cross rod is parallel to the horizontal support rod; the bottom cross rod and the horizontal support rod are connected by a connecting rod, and the front leg assembly and the horizontal support rod can rotate relatively;
    wherein one end of the front leg support assembly is rotatably connected with the lower end of the rear leg connecting assembly, and the other end is rotatably connected with the front leg assembly; the upper end of the rear leg assembly is connected to the bottom of the handle assembly, and relatively rotates with the horizontal support rod as an axis;
    wherein the torsion spring is provided at the connection between the front leg support assembly and the rear leg connecting assembly, and the torsion spring controls the opening and closing of the front leg support assembly and the rear leg connecting assembly by the rotation.

2. The foldable baby carriage frame mentioned in claim 1, wherein the handle assembly includes an upper handle, a lower handle, a spring button and a pull wire; the upper handle is assembled by multiple independent rods, and has a U-shaped structure; wherein the two ends of the opening of the upper handle are respectively connected to the upper end of the lower handle; the spring button is installed on the upper handle; the upper handle and the lower handle are hollow tubulars; and the pull wire passes through the upper handle and lower handle.

3. The foldable baby carriage frame mentioned in claim 2, wherein the rear leg assembly has two parallel rod-like structures, and the upper ends of the rear leg assembly are respectively hinged to the lower handle.

4. The foldable baby carriage frame mentioned in claim 2, wherein two ends of the horizontal support rod are respectively connected to the lower end of the lower handle.

* * * * *